US012276141B2

(12) United States Patent
Lee

(10) Patent No.: US 12,276,141 B2
(45) Date of Patent: Apr. 15, 2025

(54) LATCH MECHANISM OPENING/CLOSING DETECTION SYSTEM

(71) Applicants: HYUNDAI MOTOR COMPANY, Seoul (KR); KIA CORPORATION, Seoul (KR)

(72) Inventor: Jong Seon Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 99 days.

(21) Appl. No.: 18/137,072

(22) Filed: Apr. 20, 2023

(65) Prior Publication Data

US 2024/0175300 A1 May 30, 2024

(30) Foreign Application Priority Data

Nov. 25, 2022 (KR) ........................ 10-2022-0160348

(51) Int. Cl.
*E05B 81/66* (2014.01)
*E05B 81/68* (2014.01)
*E05B 81/72* (2014.01)

(52) U.S. Cl.
CPC .............. *E05B 81/66* (2013.01); *E05B 81/68* (2013.01); *E05B 81/72* (2013.01)

(58) Field of Classification Search
CPC .......... E05B 81/64; E05B 81/66; E05B 81/68; E05B 81/72; E05B 85/26
See application file for complete search history.

(56) References Cited

U.S. PATENT DOCUMENTS

| | | | | |
|---|---|---|---|---|
| 7,857,362 | B2 * | 12/2010 | Deblock | E05B 85/26 292/201 |
| 8,441,346 | B2 * | 5/2013 | Imam | E05B 81/66 340/447 |
| 9,290,969 | B2 * | 3/2016 | Yokota | E05B 85/02 |
| 11,332,964 | B2 * | 5/2022 | Strole | E05B 81/16 |
| 11,933,083 | B2 * | 3/2024 | Reusch | E05B 85/26 |
| 12,071,792 | B2 * | 8/2024 | Kawanobe | E05B 81/06 |
| 2018/0355644 | A1 * | 12/2018 | Jeong | E05B 83/18 |

FOREIGN PATENT DOCUMENTS

| | | | | |
|---|---|---|---|---|
| JP | H0578858 U | * 10/1993 | | |
| JP | 2019085816 A | * 6/2019 | | |
| JP | 2021183783 A | * 12/2021 | | E05B 81/14 |
| KR | 10-1637805 B1 | 7/2016 | | |
| KR | 2016-0115569 A | 10/2016 | | |

* cited by examiner

*Primary Examiner* — Kristina R Fulton
*Assistant Examiner* — Noah Horowitz
(74) *Attorney, Agent, or Firm* — MCDONNELL BOEHNEN HULBERT & BERGHOFF LLP

(57) ABSTRACT

A latch mechanism opening and closing detection system for accurately detecting the open and closed state of a door including a claw configured to be pushed by a striker and rotated in a fastening direction; a pawl member configured to contact the claw and rotate in an interlocked manner such that the claw engages at a half-lock point corresponding to a middle portion of a rotation range of the claw and at a full-lock point corresponding to an end portion of the rotation range, thereby limiting rotation of the claw in an unfastening direction; and a full-lock detection switch configured not to be manipulated at the half-lock point and configured to be switching-manipulated at the full-lock point by the claw and the pawl member, thereby detecting a state in which the claw is fully fastened to the striker.

8 Claims, 11 Drawing Sheets

④ Door being fully locked

① Door opened

② Door half-locked

④ Door fully-locked

③ Door between half-locked and full-locked

④ Door being fully locked

⑤ Door fully-locked

LATCH MECHANISM OPENING/CLOSING DETECTION SYSTEM

CROSS REFERENCE TO RELATED APPLICATIONS

This application is based on and claims priority under 35 U.S.C. 119 to Korean Patent Application No. 10-2022-0160348, filed on Nov. 25, 2022, in the Korean Intellectual Property Office, the disclosure of which is herein incorporated by reference in its entirety.

BACKGROUND

1. Field

The present disclosure relates to a latch mechanism opening/closing detection system for accurately detecting the open/closed state of a door.

2. Description of the Prior Art

A vehicle has doors installed on side portions thereof such that passengers can get into/out of the vehicle.

The vehicle has a trunk lid or tailgate installed on the rear side thereof such that cargo can be loaded therein.

Such doors, trunk lids, and tailgates (hereinafter, simply referred to as "doors") are all installed on the chassis to be opened/closed by latch mechanisms.

A latch mechanism will now be described briefly. A claw is installed on a door, and a striker is installed on the chassis side so as to correspond to the claw.

If the door is closed, the claw engages with the striker and locks the door. If a release lever is operated, the claw disengages from the striker and unlocks the door, thereby opening the door.

FIG. 1 to FIG. 4 illustrate successive door closing operations, as related arts of the present disclosure.

Referring to the drawings, an ajar switch 30 is installed inside the latch mechanism 1 to confirm whether the door is fully closed during the door closing process.

For example, the ajar switch 30 maintains a turned-on state while the door is open.

If the striker 40 enters the claw 10 and pushes the claw 10, the claw 10 pushed by the striker 40 rotates, and the ajar switch 30 switches to a turned-off state.

The timepoint at which the ajar switch 30 operates to switch the turned-on/off state may be configured to be a timepoint (about 2±1 mm) immediately before the claw 10 engages with the pawl member 20 and fully closes the door (full lock (0 mm)) with reference to the stroke of the striker 40. The timepoint of switching operation of the ajar switch 30 may be configured by detecting the rotational displacement of the claw 10.

Such a configuration is made to prevent the occurrence of signal errors according to the position between components and the dispersion of individual components.

That is, if the turn-off operating timepoint of the ajar switch 30 is configured to be the full lock point (0 mm) at which the door is fully closed with reference to the stroke of the striker 40, there is a possibility that, if dispersion between components occurs, the ajar switch 30 will not switch to the turned-off state because the ajar switch 30 remains pressed even if the door is fully closed.

Therefore, in order to solve the problem of generating a warning light when the door is fully closed, because it is erroneously determined that the door is open, a timepoint immediately before the full lock is configured as the ajar switch operating timepoint.

However, if a timepoint immediately before the full lock is configured as the ajar switch operating timepoint as described above, the ajar switch recognizes that the door is fully locked before the claw is fully closed by the striker, thereby causing another problem.

For example, if the door loses the repulsive force, it may be recognized that the door is already fully locked when the door has reached position ③, which is a timepoint (−2 mm) immediately before the door is fully locked, although the door is not fully closed, as in FIG. 5 as a related art of the present disclosure.

Such an erroneous determination that the door is closed, although the door is open, poses a problem of a potential accident.

In addition, if the pawl and the claw reach a balance of force immediately before the door is fully locked, or if an external object gets stuck and prevents the door from being fully fastened, the door may be opened, or a door open warning light may be displayed, depending on the vehicle behavior during traveling, although the door may not be opened when the vehicle is stationary. This may make the passengers nervous and degrade traveling safety.

The above descriptions regarding background technologies have been made only to help understanding of the background of the present disclosure, and are not to be deemed by those skilled in the art to correspond to already-known prior arts.

SUMMARY

The present disclosure has been made to solve the above-mentioned problems, and may provide a latch mechanism opening/closing detection system configured to accurately detect the open/closed state of a door.

In accordance with an aspect of the present disclosure, a latch mechanism opening/closing detection system may include a claw configured to be pushed by a striker and rotated in a fastening direction, a pawl member configured to contact the claw and rotate in an interlocked manner such that the claw engages at a half-lock point corresponding to a middle portion of a rotation range of the claw and at a full-lock point corresponding to an end portion of the rotation range, thereby limiting rotation of the claw in an unfastening direction, and a full-lock detection switch configured not to be manipulated at the half-lock point and configured to be switching-manipulated at the full-lock point by the claw and the pawl member, thereby detecting a state in which the claw is fully fastened to the striker.

The claw may have a sub-manipulation portion formed thereon, the pawl member may have a main manipulation portion formed thereon, and the full-lock detection switch may be positioned on a path of rotation of the sub-manipulation portion and on a path of rotation of the main manipulation portion such that, at the full-lock point, the sub-manipulation portion and the main manipulation portion are successively pressed against the full-lock detection switch.

At the full-lock point, the full-lock detection switch may be primarily pressed by the sub-manipulation portion and secondarily pressed by the main manipulation portion.

The full-lock detection switch may have a switch button having a free end configured to be able to hinge-rotate around a fixed end, the sub-manipulation portion may rotate at the full-lock point and primarily press the switch button such that the free end of the switch button is positioned within the path of rotation of the main manipulation portion, and the main manipulation portion may rotate at the full-lock point and secondarily press the free end of the switch button such that the full-lock detection switch is switching-manipulated.

The switch button may be pressed up to a middle point of a hinge rotation range by the sub-manipulation portion and is pressed from the middle point of the hinge rotation range to an end point by the main manipulation portion.

At the half-lock point, the full-lock detection switch may not be pressed by the sub-manipulation portion and the main manipulation portion such that the full-lock detection switch is not manipulated.

The sub-manipulation portion and the main manipulation portion may be formed on the claw and the pawl member so as to protrude in an identical direction, respectively, and the full-lock detection switch may be fixed inside a latching mechanism facing the sub-manipulation portion and the main manipulation portion.

The claw may have a full-lock engaging portion formed thereon, and the pawl member may have a pawl stepped portion formed thereon such that the full-lock engaging portion engages with the pawl stepped portion at the full-lock point, the sub-manipulation portion may be formed adjacent to the full-lock engaging portion, and the main manipulation portion may be positioned to face the pawl stepped portion with the full-lock detection switch interposed therebetween.

A fastening signal may be switched in a state in which pressing manipulation of the full-lock detection switch is completed.

A fastening signal may be switched when the full-lock detection switch is pressed by the main manipulation portion.

The present disclosure, as described above, is advantageous in that the full-lock detection switch is pressing-operated only when the door is fully closed, and a closed door signal is thus received. Therefore, the door opening/closing state is accurately detected, and the traveling safety of the vehicle is thus improved.

BRIEF DESCRIPTION OF THE FIGURES

The above and other aspects, features, and advantages of the present disclosure will be more apparent from the following detailed description taken in conjunction with the accompanying drawings, in which.

DETAILED DESCRIPTION

Figure 1:
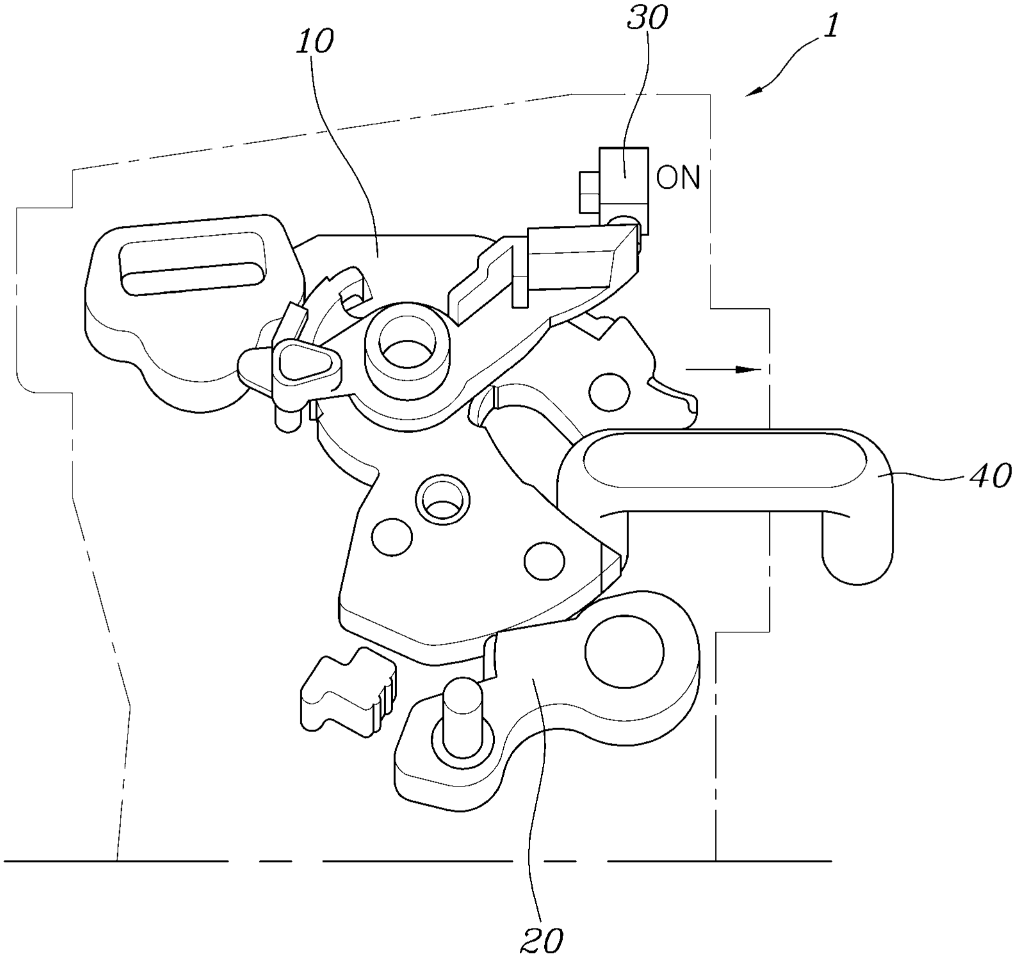
FIGS. 1, 2, 3, and 4 illustrate on/off operations of an ajar switch during a process in which a conventional door is closed.
Figure 2:
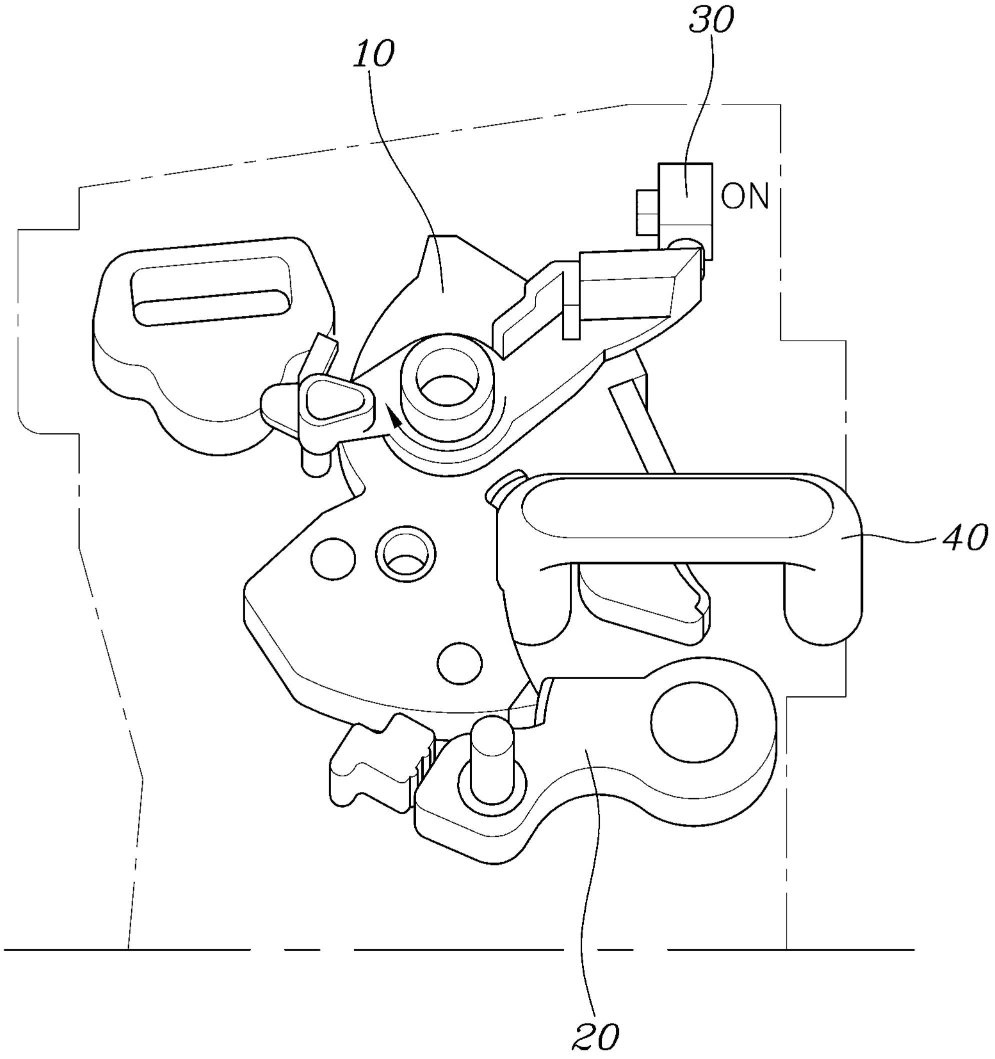
Figure 3:
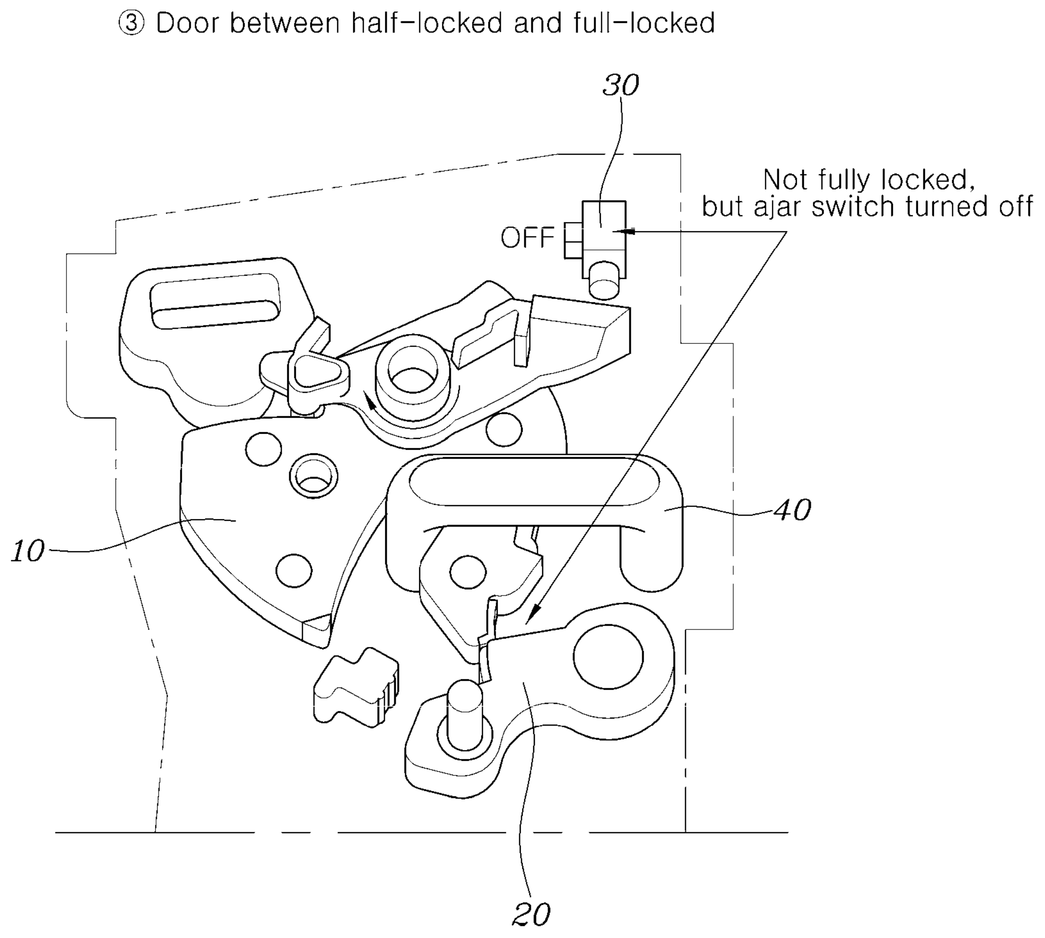
Figure 4:
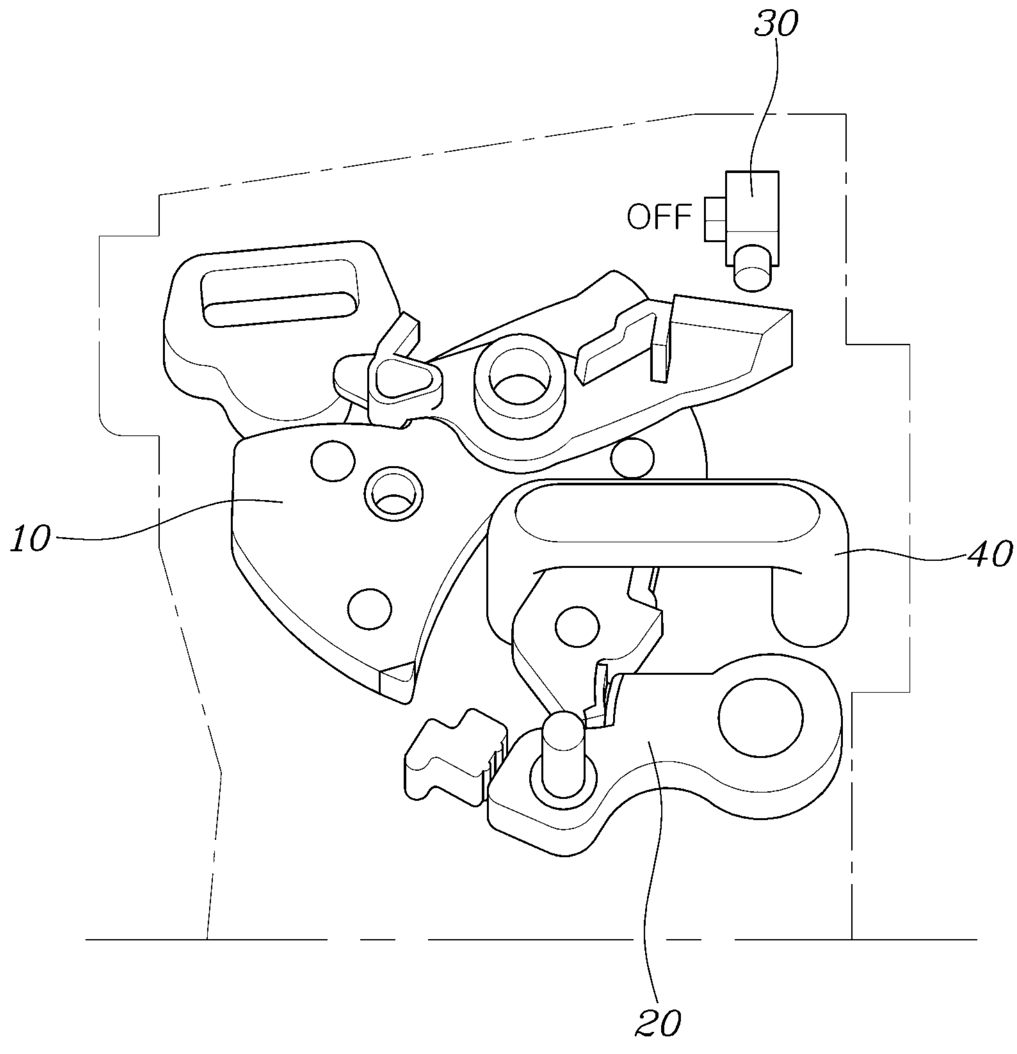
Figure 5:
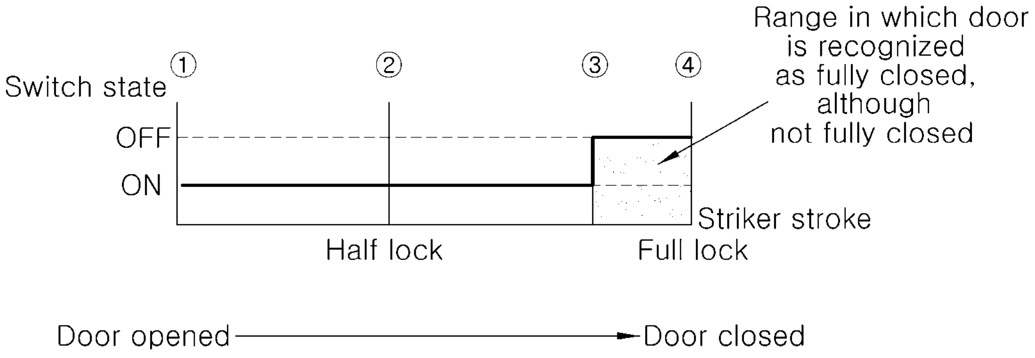
FIG. 5 illustrates a change in a signal detected in the ajar switch during the operations in FIG. 1 to FIG. 4.
Figure 6:
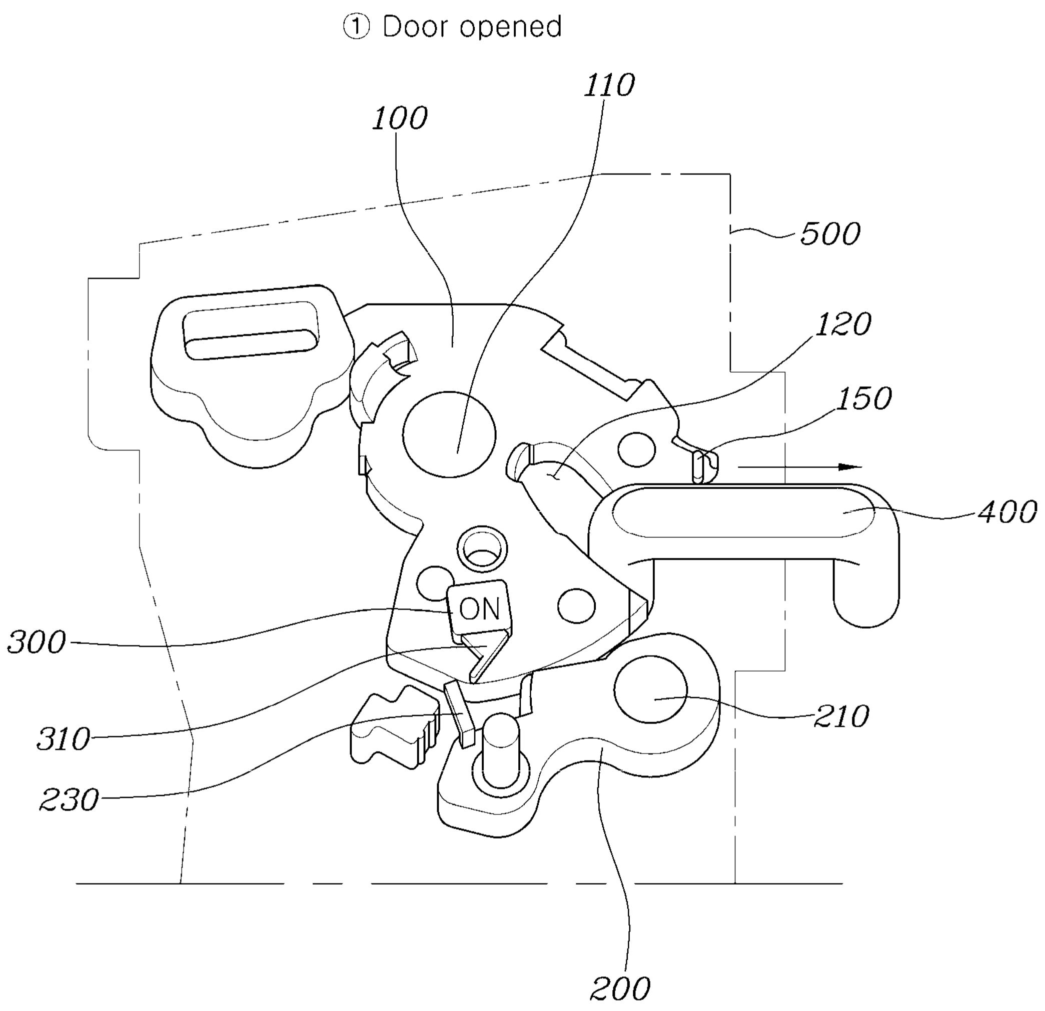
FIGS. 6, 7, 8, 9, and 10 illustrate on/off operations of a full lock detection switch during a process in which a door of the present disclosure is closed.

Hereinafter, embodiments disclosed in the present specification will be described in detail with reference to the accompanying drawings, and the same or similar elements are given the same and similar reference numerals, so duplicate descriptions thereof will be omitted.

The terms “module” and “unit” used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as “first”, “second”, or the like may be used to describe various elements, but the elements are not limited to the terms. The above terms are used only for the purpose of distinguishing one element from another element.

In the case where an element is referred to as being “connected” or “coupled” to any other element, it should be understood that another element may be provided therebetween, as well as that the element may be directly connected or coupled to the other element. In contrast, in the case where an element is “directly connected” or “directly coupled” to any other element, it should be understood that no other element is present therebetween.

A singular expression may include a plural expression unless they are definitely different in a context.

As used herein, the expression “include” or “have” are intended to specify the existence of mentioned features, numbers, steps, operations, elements, components, or combinations thereof, and should be construed as not precluding the possible existence or addition of one or more other features, numbers, steps, operations, elements, components, or combinations thereof.

In addition, a controller may include a communication device configured to communicate with a sensor or another control unit, a memory configured to store an operation system, a logic command, or input/output information, and at least one processor configured to perform determination, calculation, decision or the like which are required for responsible function controlling.

FIG. 6 to FIG. 10 illustrate on/off operations of a full lock detection switch 300 during a process in which a door of the present disclosure is closed.

Referring to the drawings, a latch mechanism opening/closing detection system according to the present disclosure includes a claw 100 configured to be pushed by a striker 400 and rotated in a fastening direction; a pawl member 200 configured to contact the claw 100 and to rotate in an interlocked manner such that the claw 100 engages therewith at a half-lock point in the middle of a rotating range and at a full-lock point corresponding to an end of the rotating range, thereby limiting rotation of the claw 100 in the unfastening direction, and a full-lock detection switch 300 configured not to be manipulated at the half-lock point and to be switching-manipulated by the claw 100 and the pawl member 200 at the full-lock point, thereby detecting a state in which the claw 100 is fully fastened to the striker 400.

For example, the striker 400 is fixed to a door opening portion formed on a vehicle side surface.

The claw 100, the pawl member 200, and the full-lock detection switch 300 are contained in a latch housing 500 so as to constitute a latch mechanism, and the latch mechanism is installed on a door. The claw 100 of the latch mechanism is then fastened to or unfastened from the striker 400 such that the door can be manipulated to be opened/closed.

In addition, the striker 400 may be fixed to a tailgate opening portion formed on the vehicle rear side, and the latch mechanism may be installed on the tailgate such that the tailgate can be manipulated to be opened/closed. The opening/closing detection system of the present disclosure is applicable to such a structure as well.

Components of the latch mechanism will now be detailed in more detail. The claw 100 has a claw rotating shaft 110 formed in the middle thereof, and the claw 100 rotates in the forward/backward direction around the claw rotating shaft 110. When the claw 100 is fastened to the striker 400 when rotating in the forward direction, and is unfastened from the striker 400 when rotating in the backward direction.

The outside of a hook groove 120 is open on the claw 100 along a radial direction toward the striker 400. The striker 400 enters the open portion of the hook groove 120 and is fastened inside the hook groove 120.

A half-lock engaging portion 130 and a full-lock engaging portion 140 are formed parts of both outer ends of the hook groove 120, which adjoint an edge of the claw 100, respectively. The pawl member 200 selectively engages with the half-lock engaging portion 130 and the full-lock engaging portion 140 according to the rotational displacement of the claw 100. Although not illustrated in the drawings, an elastic member may be additionally provided to provide a constant elastic force to the claw 100 in the rotational direction in which the claw 100 is fastened to the striker 400.

The pawl member 200 may be positioned to face the claw 100 with the striker 400 interposed therebetween.

The pawl member 200 has a pawl rotating shaft 210 formed on an end thereof such that the pawl member 200 rotates in the forward/backward direction around the pawl rotating shaft 210.

A pawl stepped portion 220 is formed on a side surface of the pawl member 200, which faces the claw 100, in a stepped shape. The pawl stepped portion 220 successively engages with the half-lock engaging portion 130 and the full-lock engaging portion 140 while the claw 100 rotates in a direction in which the same is fastened to the striker 400. While the half-lock engaging portion 130 and the full-lock engaging portion 140 engage with the pawl stepped portion 220, rotation of the claw 100 in a direction in which the same is unfastened from the striker 400 is limited.

That is, if the half-lock engaging portion 130 engages with the pawl stepped portion 220 while the claw 100 rotates in the direction in which the same is fastened to the striker 400, the claw 100 is fastened to the striker 400 in a half-lock state, and if the full-lock engaging portion 140 engages with the pawl stepped portion 220, the claw 100 is fastened to the striker 400 in a full-lock state.

Although not illustrated in the drawings, an elastic member may be additionally provided to provide a constant elastic force to the pawl member 200 in the rotational direction in which pawl stepped portion 220 engages with the claw 100.

Particularly, according to the present disclosure, the full-lock detection switch 300 does not operate while the half-lock engaging portion 130 engages with the pawl stepped portion 220 such that the claw 100 is half-fastened to the striker 400, but the full-lock detection switch 300 operates while the full-lock engaging portion 140 engages with the pawl stepped portion 220 such that the claw 100 is fully-fastened to the striker 400, thereby switching the signal generated in the full-lock detection switch 300.

The full-lock detection switch 300 may be a switch mechanically pressed to switch turned-on/off signals.

Figure 10:
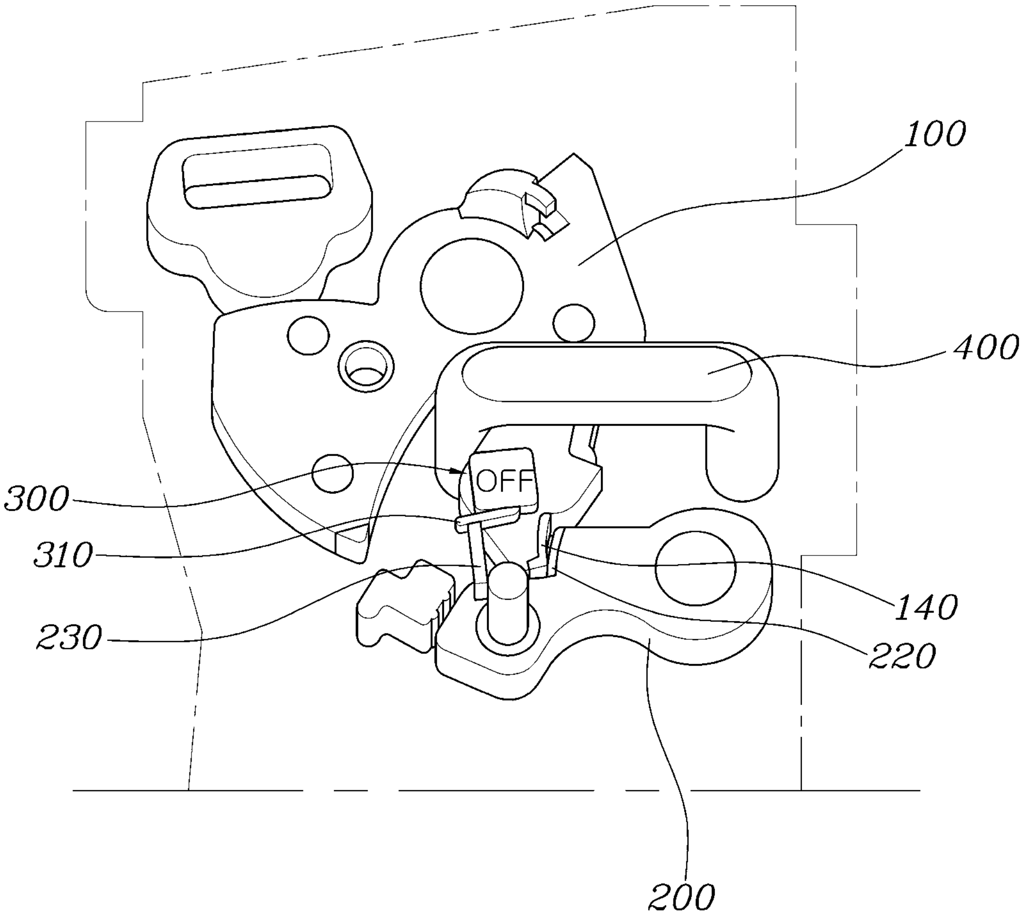

That is, as in FIG. 10, when the half-lock engaging portion 130 engages with the pawl stepped portion 220 while the claw 100 rotated in a direction in which the same is fastened to the striker 400 (in a half-lock state), the full-lock detection switch 300 is not pressed, and the controller receives an "ON" signal from the full-lock detection switch 300.

On the other hand, when the full-lock engaging portion 140 engages with the pawl stepped portion 220 after the claw 100 is fully rotated in the direction in which the same is fastened to the striker 400 (in a full-lock state), the full-lock detection switch 300 is pressed, and the controller receives an "OFF" signal from the full-lock detection switch 300.

Therefore, a door open signal is received not only in the door half-lock state, but also until the door is fully closed, and a door closed signal is received only when the door is fully closed (full-lock state). As such, the door opening/closing state is accurately detected, thereby improving vehicle traveling safety.

Figure 7:
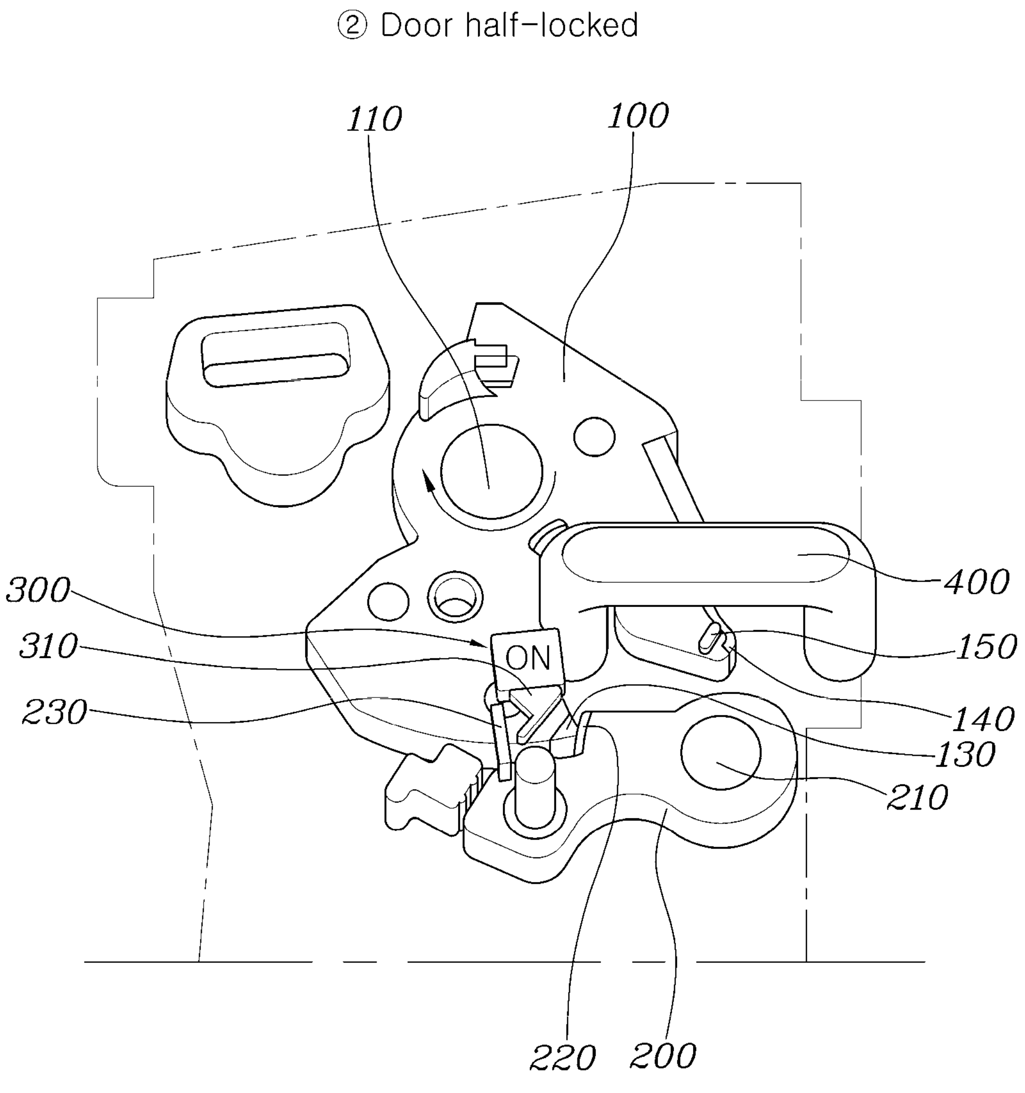
Figure 8:
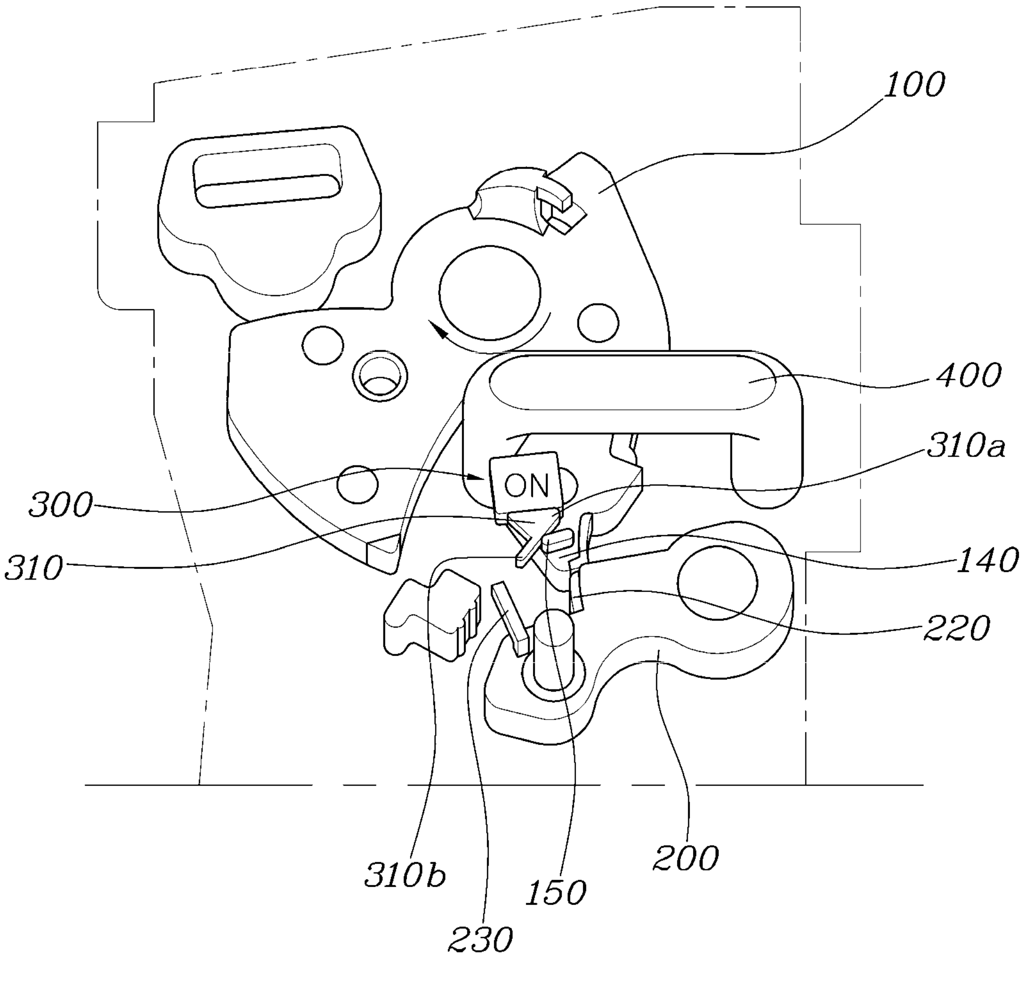

In addition, as in FIG. 7 and FIG. 8, a sub-manipulation portion 150 is formed on the claw 100, and a main manipulation portion 230 is formed on the pawl member 200. The full-lock detection switch 300 is positioned on the path of rotation of the sub-manipulation portion 150 and the main manipulation portion 230 such that the sub-manipulation portion 150 and the main manipulation portion 230 may be successively pressed by the full-lock detection switch 300 at the full-lock point and thus switching-manipulated.

Specifically, the full-lock detection switch 300 may be primarily pressed by the sub-manipulation portion 150 at the full-lock point, and by the main manipulation portion 230 secondarily.

That is, the sub-manipulation portion 150 is formed on the claw 100 and rotated around the claw rotating shaft 110, and the main manipulation portion 230 is formed on the pawl member 200 and rotated around the pawl rotating shaft 210.

At the full-lock point at which the full-lock engaging portion 140 engages with the pawl stepped portion 220 as the claw 100 rotates, the sub-manipulation portion 150 first presses the full-lock detection switch 300, and the main manipulation portion 230 then presses the full-lock detection switch 300.

The configuration for successively pressing/operating the full-lock detection switch 300 successively by the sub-manipulation portion 150 and the main manipulation portion 230 will be described in more detail.

Figure 9:
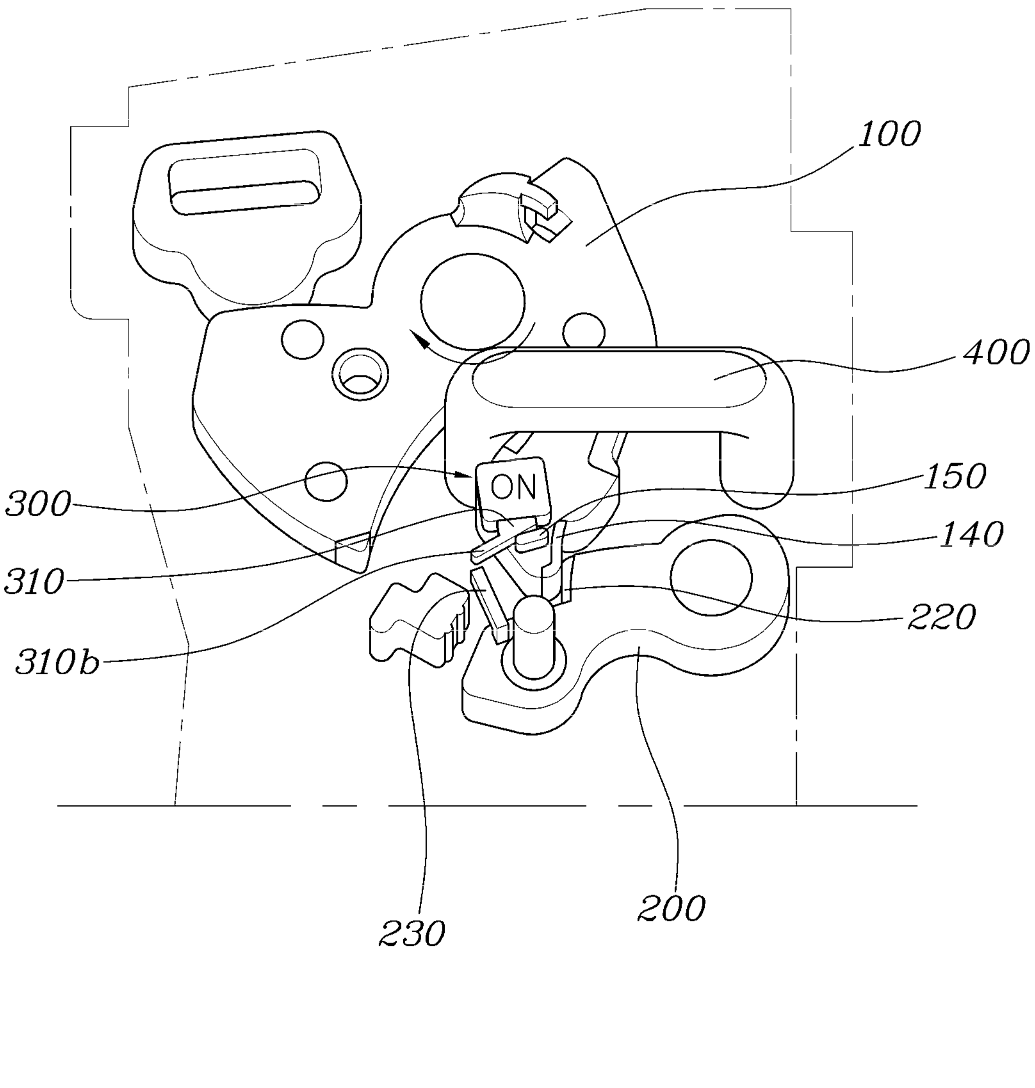

As illustrated in FIG. 8 to FIG. 10, the full-lock detection switch 300 has a switch button 310 having a free end **310*b* configured to be able to hinge-rotate around a fixed end 310*a* thereof. At the full-lock point, the sub-manipulation portion 150 rotates and primarily presses the switch button 310 such that the free end 310*b* of the switch button 310 is positioned within the path of rotation of the main manipulation portion 230. At the full-lock point, the main manipulation portion 230 rotates and secondarily presses the free end 310*b* of the switch button 310 such that the full-lock detection switch 300** can be switching-manipulated.

For example, the switch button 310 is provided at the lower end of the full-lock detection switch 300. The switch button 310 is configured to be able to hinge-rotate around the fixed end **310*a*** on one side of the upper end thereof.

As illustrated in FIG. 8, the switch button 310 is positioned on the path of rotation of the sub-manipulation portion 150, and the sub-manipulation portion 150 thus primarily presses a side surface of the switch button 310 between the fixed end 310*a* and the free end 310*b* of the switch button 310 such that the switch button 310 hinge-rotates around the fixed end 310*a*.

The switch button 310 is then pressed as if sloping toward the direction of rotation of the sub-manipulation portion 150 as in FIG. 9 such that the free end 310*b* of the switch button 310 is positioned within the path of rotation of the main manipulation portion 230.

The main manipulation portion 230 secondarily pushes the free end 310*b* of the switch button 310 upwards as in FIG. 10 such that the switch button 310 is additionally manipulated to rotate.

Therefore, the full-lock detection switch 300 switches from the turned-on state to the turned-off state, and the door is confirmed as fully locked.

Moreover, the switch button 310 is pressed up to the middle point of the hinge rotation range by the sub-manipulation portion 150, and is pressed from the middle point of the hinge rotation range to the end point by the main manipulation portion 230.

For example, the sub-manipulation portion 150 presses the switch button 310 while maintaining a predetermined interval from the fixed end 310*a* of the switch button 310 such that, even when the full-lock engaging portion 140 fully engages with the pawl engaging portion, the switch button 310 is not pressed to the end, but is pressed up to the middle point of the hinge rotation range.

The main manipulation portion 230 then presses the switch button 310 pressed up to the middle point of the hinge rotation range. As a result, the switch button 310 is pressed from the middle point of the hinge rotation range to the end point, thereby completing the switching manipulation of the full-lock detection switch 300.

In addition, according to the present disclosure, the switch button 310 is not pressed by the sub-manipulation portion 150 and the main manipulation portion 230 at the half-lock point, and the full-lock detection switch 300 is thus not manipulated.

That is, as illustrated in FIG. 7, when the half-lock engaging portion 130 engages with the pawl stepped portion (half-lock state), the sub-manipulation portion 150 is spaced apart from the switch button 310, and the switch button 310 is thus not pressed by the sub-manipulation portion 150.

As the switch button 310 is not pressed by the sub-manipulation portion 150, the switch button 310 remains away from the path of rotation of the main manipulation portion 230, and the switch button 310 is not pressed by the main manipulation portion 230 either.

Meanwhile, as illustrated in FIG. 8, the sub-manipulation portion 150 and the main manipulation portion 230 may be formed on the claw 100 and the pawl member 200 so as to protrude in the same direction, respectively, and the full-lock detection switch 300 may be fixed inside a latch mechanism facing the sub-manipulation portion 150 and the main manipulation portion 230.

The claw 100 may have a full-lock engaging portion 140 formed thereon, and the pawl member 200 may have a pawl stepped portion 220 such that the full-lock engaging portion 140 engages with the pawl stepped portion 220 at the full-lock point. The sub-manipulation portion 150 may be formed adjacent to the main manipulation portion 230. The main manipulation portion 230 may be positioned to face the pawl stepped portion 220 with the full-lock detection switch 300 interposed therebetween.

For example, the sub-manipulation portion 150 is formed on a surface of the full-lock engaging portion 140 so as to protrude in an elliptical column shape.

The main manipulation portion 230 is formed on a surface of the pawl member 200, which faces the stepped surface of the pawl stepped portion 220, so as to protrude in a bar shape.

The full-lock detection switch 300 is fixedly installed on the inner surface of a latching housing 500 in which the claw 100 and the pawl member 200 are contained.

As the claw 100 rotates, the full-lock engaging portion 140 rolls along the profile of the side surface of the pawl member 200 such that the distance between the sub-manipulation portion 150 and the switch button 310 is reduced. As the full-lock engaging portion 140 engages with the pawl stepped portion 220, the switch button 310 is pressed by the sub-manipulation portion 150 and then pressed by the main manipulation portion 230.

Therefore, the full-lock detection switch 300 is pressing-manipulated such that a fully closed door state is detected.

Figure 11:
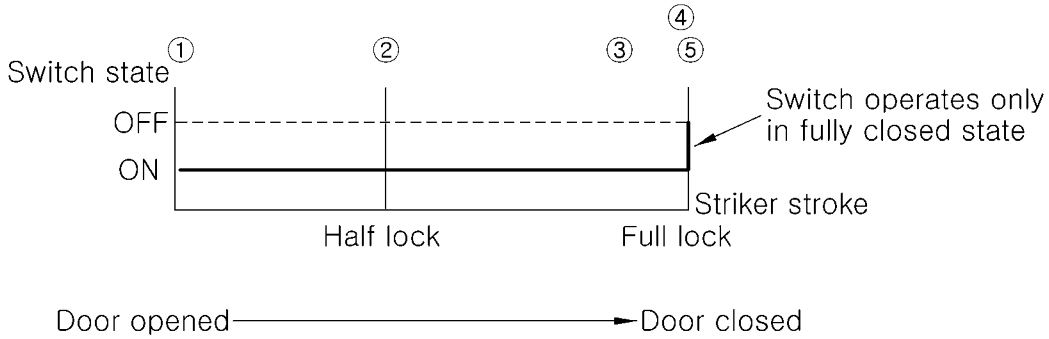
FIG. 11 illustrates a change in a signal detected in the full lock detection switch during the operations in FIG. 6 to FIG. 10.

In addition, as in FIG. 10 and FIG. 11, a fastening signal may be switched after pressing manipulation of the full-lock detection switch 300 is completed.

Preferably, the fastening signal may be switched when the full-lock detection switch 300 is pressed by the main manipulation portion 230.

That is, the full-lock detection switch 300 starts operating as the sub-manipulation portion 150 presses the switch button 310, but the signal from the full-lock detection switch 300 is detected to be in a turned-on state when the sub-manipulation portion 150 presses the switch button 310.

However, if the switch button 310 is pressed to the end by the main manipulation portion 230, the signal from the full-lock detection switch 300 is detected to be in a turned-off state.

Hereinafter, operations for detecting the open/closed state of a door according to the present disclosure will be described.

If the door is closed, the claw 100 is rotated around the claw rotating shaft 100 in the fastening direction by the force with which the striker 400 pushes the claw 100, and the striker 400 thus enters the hook groove 120 formed on the claw 100.

Thereafter, as in FIG. 7, the claw 100 rotates such that the half-lock engaging portion 130 of the claw 100 engages with the pawl stepped portion 220 of the pawl member 200, thereby constraining rotation of the claw 100 in the unfastening direction. In this state, the striker 400 is half-fastened inside the hook groove 120 (half-lock state).

If the claw 100 further rotates in the fastening direction of the claw 100 in such a half-lock state, the striker 400 moves toward the inner end of the hook groove 120 as in FIG. 8, and the sub-manipulation portion 150 formed on the claw 100 starts pushing and pressing the switch button 310 immediately before the full-lock engaging portion 140 engages with the pawl stepped portion 220.

If the claw 100 then rotates further, the full-lock engaging portion 140 engages with the full-lock engaging portion 140 as in FIG. 9 such that the sub-manipulation portion 150 presses the switch button 310. The free end 310*b* of the switch button 310 is thus positioned within the path of rotation of the main manipulation portion 230.

The pawl member 20 then rotates upwards as in FIG. 10 such that the main manipulation portion 230 presses the free end 310*b* of the switch button 310. Accordingly, the full-lock detection switch 300 is pressing-manipulated to the end, and provides a door fastening signal to the controller such that a fully closed door state is detected.

As described above, according to the present disclosure, the full-lock detection switch 300 is pressing-operated only when the door is fully closed, and a closed door signal is thus received. Therefore, the door opening/closing state is accurately detected, and the traveling safety of the vehicle is thus improved.

Although the present disclosure has been described and illustrated in conjunction with particular embodiments thereof, it will be apparent to those skilled in the art that various changes and modifications may be made to the present disclosure within the technical idea of the present disclosure, and these changes and modifications fall within the scope of the appended claims.

The invention claimed is:

1. A latch mechanism opening and closing detection system comprising:

a claw configured to be pushed by a striker and rotated in a fastening direction;

a pawl member configured to contact and interlock the claw and configured to rotate with the claw, such that the claw engages at a half-lock point corresponding to a middle portion of a rotation range of the claw and at a full-lock point corresponding to an end portion of the rotation range, thereby limiting rotation of the claw in an unfastening direction; and a full-lock detection switch configured not to be manipulated at the half-lock point and configured to be manipulated at the full-lock point by the claw and the pawl member, thereby detecting a state in which the claw is fully fastened to the striker;

wherein the claw has a sub-manipulation portion, the pawl member has a main manipulation portion, and the full-lock detection switch is positioned on a path of rotation of the sub-manipulation portion and on a path of rotation of the main manipulation portion such that, at the full-lock point, the sub-manipulation portion and the main manipulation portion are successively pressed against the full-lock detection switch; and wherein the full-lock detection switch has a switch button having a free end configured to hinge-rotate around a fixed end, the sub-manipulation portion rotates at the full-lock point and first presses the switch button such that the free end of the switch button is positioned within the path of rotation of the main manipulation portion, and the main manipulation portion rotates to the full-lock point and then presses the free end of the switch button such that the full-lock detection switch is manipulated.

2. The latch mechanism opening and closing detection system of claim 1, wherein, at the full-lock point, the full-lock detection switch is first pressed by the sub-manipulation portion and then pressed by the main manipulation portion.

3. The latch mechanism opening and closing detection system of claim 1, wherein the switch button is pressed up to a middle point of a hinge rotation range by the sub-manipulation portion, and is pressed from the middle point of the hinge rotation range to an end point by the main manipulation portion.

4. The latch mechanism opening and closing detection system of claim 1, wherein, at the half-lock point, the full-lock detection switch is not pressed by the sub-manipulation portion and the main manipulation portion such that the full-lock detection switch is not manipulated.

5. The latch mechanism opening and closing detection system of claim 1, wherein the sub-manipulation portion protrudes from the claw in a first direction, and the main manipulation portion protrudes from the pawl member in the first direction, and the full-lock detection switch is fixed inside a latching mechanism facing the sub-manipulation portion and the main manipulation portion.

6. The latch mechanism opening and closing detection system of claim 5, wherein the claw includes a full-lock engaging portion, and the pawl member includes a pawl stepped portion such that the full-lock engaging portion engages with the pawl stepped portion at the full-lock point;

the sub-manipulation portion is formed adjacent to the full-lock engaging portion; and the main manipulation portion is positioned to face the pawl stepped portion with the full-lock detection switch interposed therebetween.

7. The latch mechanism opening and closing detection system of claim 1, wherein a fastening signal is output when pressing manipulation of the full-lock detection switch is completed.

8. The latch mechanism opening and closing detection system of claim 1, wherein a fastening signal is output when the full-lock detection switch is pressed by the main manipulation portion.

* * * * *